United States Patent
Amimoto

(10) Patent No.: US 12,447,405 B2
(45) Date of Patent: Oct. 21, 2025

(54) SERVER DEVICE, INFORMATION PROCESSING DEVICE, AND INFORMATION PROVIDING METHOD

(71) Applicant: Sony Interactive Entertainment Inc., Tokyo (JP)

(72) Inventor: Tatsuki Amimoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 284 days.

(21) Appl. No.: 18/327,975

(22) Filed: Jun. 2, 2023

(65) Prior Publication Data

US 2023/0405463 A1 Dec. 21, 2023

(30) Foreign Application Priority Data

Jun. 13, 2022 (JP) ................. 2022-094908

(51) Int. Cl.
*A63F 13/537* (2014.01)
*A63F 13/35* (2014.01)
*H04L 67/306* (2022.01)

(52) U.S. Cl.
CPC ............ *A63F 13/537* (2014.09); *A63F 13/35* (2014.09); *H04L 67/306* (2013.01)

(58) Field of Classification Search
CPC ........ A63F 13/53; A63F 13/537; A63F 13/35; A63F 13/798; A63F 13/79
See application file for complete search history.

(56) References Cited

U.S. PATENT DOCUMENTS

| | | | |
|---|---|---|---|
| 9,875,580 B2 * | 1/2018 | Cannon | G06T 19/006 |
| 10,478,728 B2 | 11/2019 | Kurabayashi | |
| 11,392,717 B1 * | 7/2022 | Friedlander | H04W 12/02 |
| 2005/0192097 A1 * | 9/2005 | Farnham | A63F 13/335 |
| | | | 463/42 |
| 2008/0096663 A1 * | 4/2008 | Lieberman | A63F 13/12 |
| | | | 463/42 |

(Continued)

FOREIGN PATENT DOCUMENTS

| | | |
|---|---|---|
| JP | 2016118854 A | 6/2016 |
| JP | 2022063756 A | 4/2022 |

(Continued)

OTHER PUBLICATIONS

"What Gamer Type Are You?", CardboardRepublic,, 2017, pp. 1-2, at https://www.cardboardrepublic.com/quiz/questions.php (last visited May 8, 2025). (Year: 2017).*

(Continued)

*Primary Examiner* — Steve Rowland
(74) *Attorney, Agent, or Firm* — Kilpatrick Townsend & Stockton LLP

(57) ABSTRACT

Provided is a server device including one or more processors including hardware, in which the one or more processors acquire pieces of meta information of a plurality of players, use the pieces of meta information of the plurality of players to generate a plurality of groups with different play styles, acquire meta information of a user who is playing a game, use the meta information of the user to identify a corresponding one of the groups to which the user belongs, and provide the user with information concerning the group to which the user belongs.

4 Claims, 11 Drawing Sheets

(56) References Cited

U.S. PATENT DOCUMENTS

| | | | |
|---|---|---|---|
| 2009/0325709 A1* | 12/2009 | Shi | G06Q 10/10 |
| | | | 463/42 |
| 2011/0107220 A1* | 5/2011 | Perlman | H04N 21/2381 |
| | | | 715/720 |
| 2012/0100910 A1* | 4/2012 | Eichorn | H04N 21/43615 |
| | | | 463/31 |
| 2014/0187323 A1* | 7/2014 | Perry | A63F 13/21 |
| | | | 463/31 |
| 2015/0224408 A1* | 8/2015 | Hayashida | A63F 13/88 |
| | | | 463/31 |
| 2016/0158656 A1* | 6/2016 | Condrey | A63F 13/86 |
| | | | 463/31 |
| 2016/0317933 A1* | 11/2016 | Shoshan | A63F 13/422 |
| 2017/0157512 A1* | 6/2017 | Long | A63F 13/86 |
| 2017/0182415 A1* | 6/2017 | Fukuda | A63F 13/86 |
| 2017/0228600 A1* | 8/2017 | Syed | G06V 20/62 |
| 2017/0270128 A1* | 9/2017 | Smith | G06F 16/78 |
| 2017/0282073 A1 | 10/2017 | Kurabayashi | |
| 2018/0077440 A1* | 3/2018 | Wadhera | H04N 21/8456 |
| 2018/0085672 A1* | 3/2018 | Oiso | A63F 13/32 |
| 2018/0232592 A1* | 8/2018 | Stewart | G08B 13/19606 |
| 2018/0307383 A1* | 10/2018 | Faulkner | H04N 7/155 |
| 2018/0337968 A1* | 11/2018 | Faulkner | H04L 51/046 |
| 2021/0046388 A1* | 2/2021 | Schwarz | H04N 21/8549 |
| 2021/0077911 A1* | 3/2021 | Duan | H04N 21/482 |

FOREIGN PATENT DOCUMENTS

| | | |
|---|---|---|
| KR | 20200119362 A | 10/2020 |
| KR | 20210062403 A | 5/2021 |

OTHER PUBLICATIONS

KR20210062403A English Translation, Google Patents, 2021, at https://patents.google.com/patent/KR20210062403A/en?oq=KR20210062403A (last visited May 8, 2025). (Year: 2021).*

Notice of Reasons for Refusal for corresponding JP Application No. 2022-094908, 8 pages, dated Mar. 4, 2024.

* cited by examiner

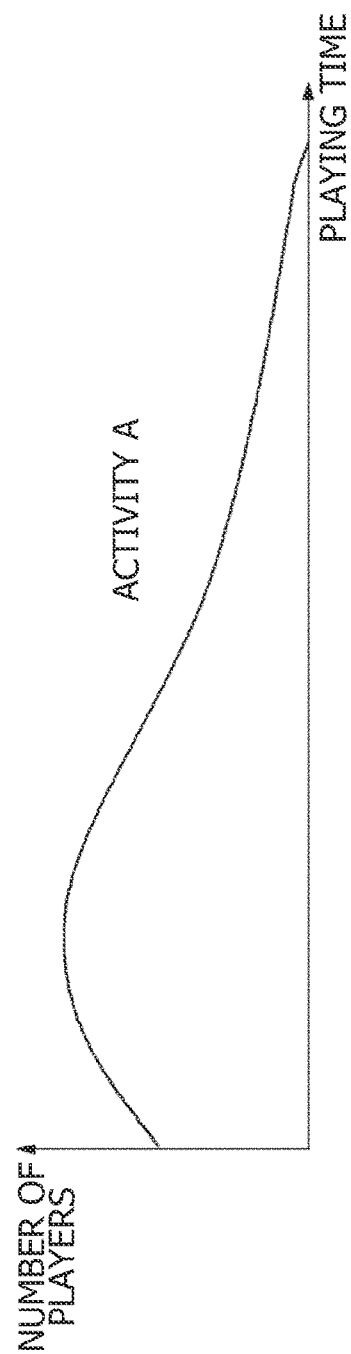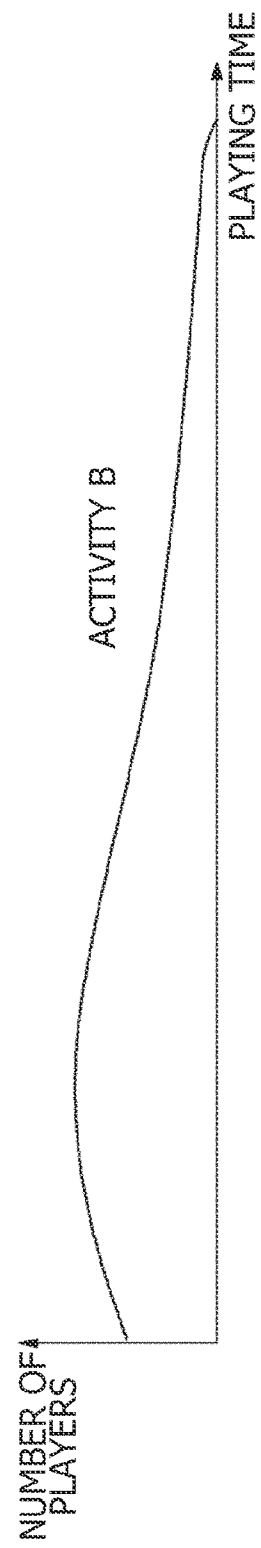

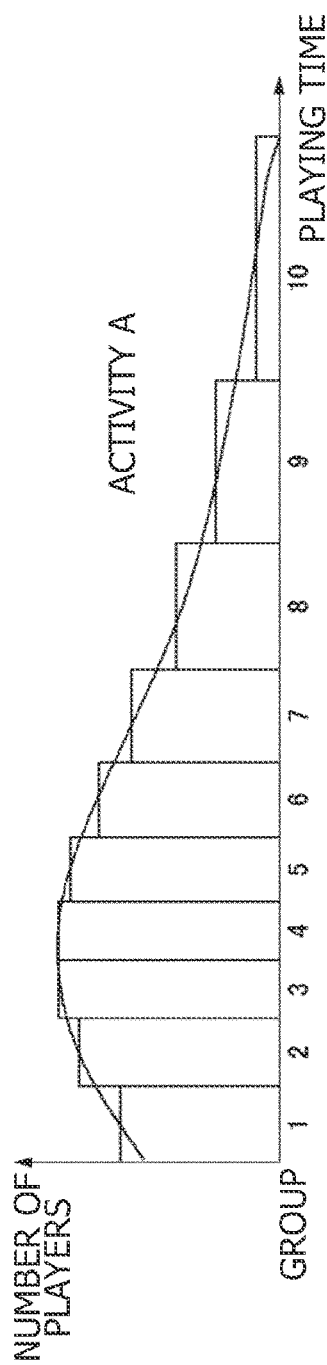
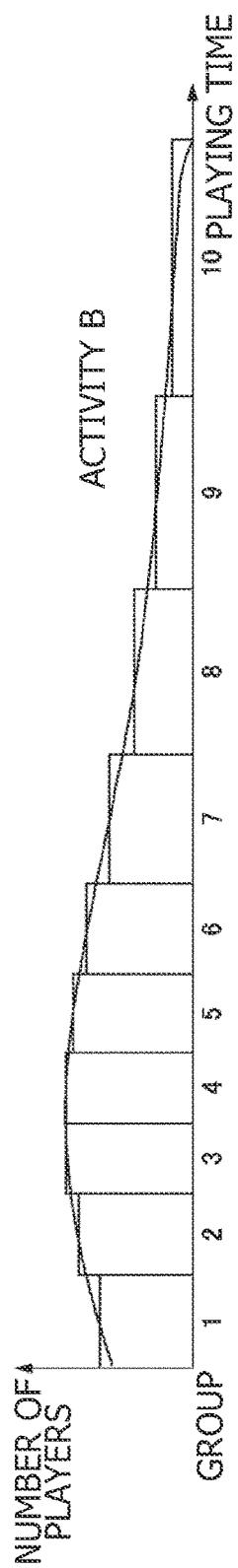
FIG. 8A
FIG. 8B

SERVER DEVICE, INFORMATION PROCESSING DEVICE, AND INFORMATION PROVIDING METHOD

CROSS REFERENCE TO RELATED APPLICATION

This application claims the benefit of Japanese Priority Patent Application JP 2022-094908 filed Jun. 13, 2022, the entire contents of which are incorporated herein by reference.

BACKGROUND

The present disclosure relates to a technology for providing information to a user playing a game.

Japanese Patent Laid-open No. 2022-63756 discloses a server device that processes pieces of event data concerning an activity performed by a plurality of players. This server device obtains lengths of playing time of a plurality of players for an activity from a plurality of pieces of event data, sorts the players into a plurality of classes according to a skill value of each player, and determines a representative value of the playing time in each class in reference to the lengths of playing time of the plurality of players in each class. The server device notifies a user of the estimated playing time based on the representative value of the playing time associated with the class of the user.

SUMMARY

Collecting, by the server device, states of playing the activity by the plurality of players makes it possible to derive various kinds of information by statistical processing. It is desirable to implement a technology for providing useful information to users.

According to one mode of the present disclosure, there is provided a server device including one or more processors including hardware, the one or more processors acquiring pieces of meta information of a plurality of players, using the pieces of meta information of the plurality of players to generate a plurality of groups with different play styles, acquiring meta information of a user who is playing a game, using the meta information of the user to identify a corresponding one of the groups to which the user belongs, and providing the user with information concerning the group to which the user belongs.

According to another mode of the present disclosure, there is provided an information processing device operated by a user, the information processing device including one or more processors including hardware, and the one or more processors acquiring meta information of the user, transmitting the meta information of the user to a server device, acquiring information concerning a group to which the user belongs that is identified in the server device with use of the meta information, and displaying the acquired information concerning the group.

According to a yet another mode of the present disclosure, there is provided a method for providing information to a user, the method including acquiring pieces of meta information of a plurality of players, using the pieces of meta information of the plurality of players to generate a plurality of groups with different play styles, acquiring meta information of a user who is playing a game, using the meta information of the user to identify a corresponding one of the groups to which the user belongs, and providing the user with information concerning the group to which the user belongs.

Note that any combination of the abovementioned constituent elements and expressions of the present disclosure converted between methods, devices, systems, recording media, computer programs, and the like are also effective as the modes of the present disclosure.

BRIEF DESCRIPTION OF THE DRAWINGS

FIGS. 7A and 7B are diagrams each illustrating a distribution curve representing a relation between the playing time for an activity and the number of players who have performed the activity;

FIGS. 8A and 8B are diagrams each illustrating a distribution of playing time;

DETAILED DESCRIPTION OF THE PREFERRED EMBODIMENT

Figure 1:
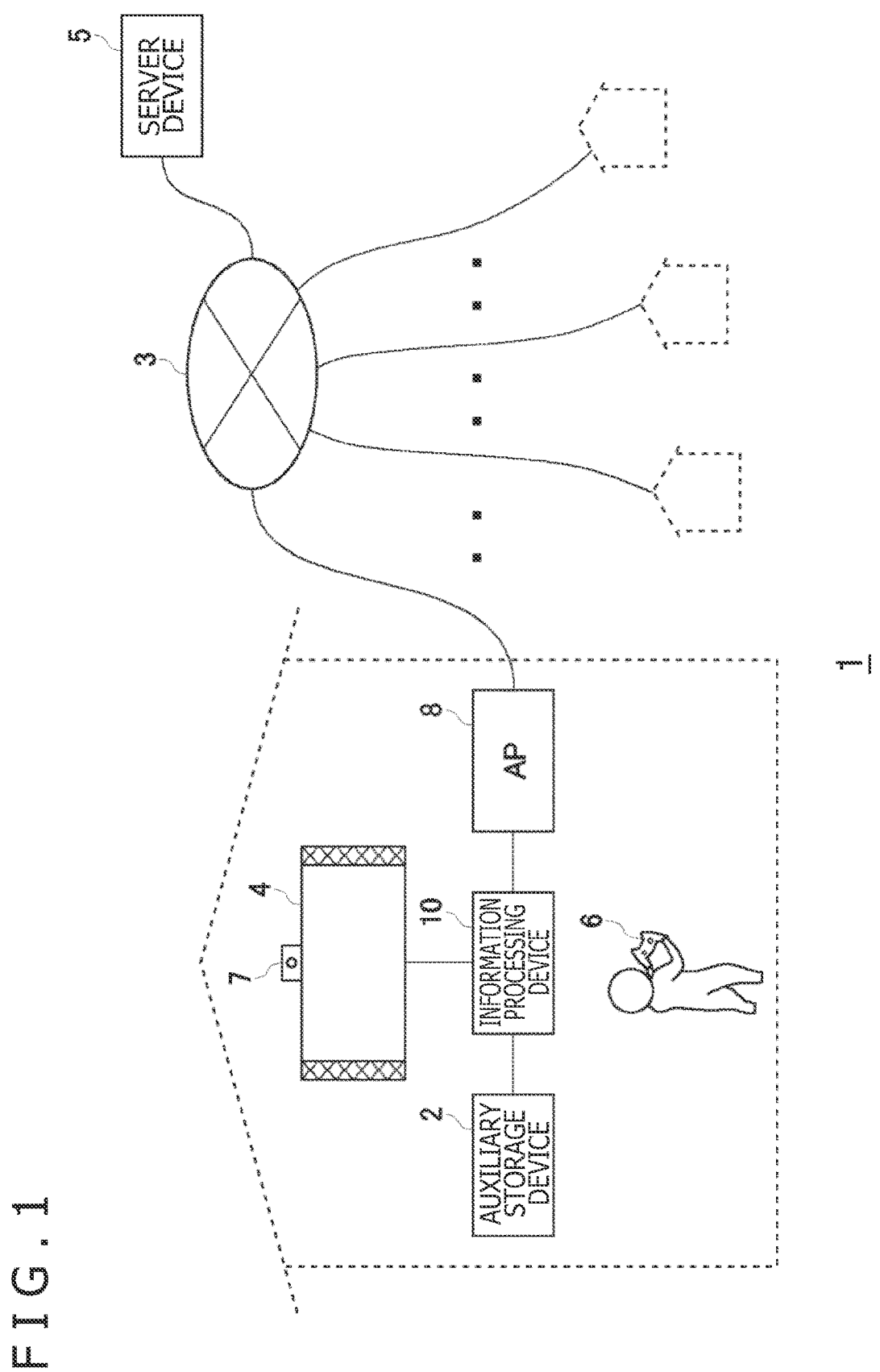
FIG. 1 is a diagram illustrating an information processing system according to an embodiment of the present disclosure.

An outline of an embodiment of the present disclosure will be described below. In the embodiment, an information processing device which is a user terminal device executes game software. When an activity is started, the game software outputs, to system software, event information including an activity identifier (activity identification (ID)) used for identifying an activity and information indicating a start of the activity. An activity is one unit of game play and may be a stage, a quest, a mission, or the like that is provided to the user as the game advances. When the activity is ended, the game software outputs, to the system software, event information including the activity ID and information indicating an end of the activity. When the activity is to be ended, the game software may include a result (success or failure) of the activity in the event information. The system software generates event data by adding a user identifier (user account) for identifying the user, a game identifier (game ID) for identifying the game, and time information (a time stamp) to the event information output from the game software, and transmits the event data to a server device.

The game software further outputs, to the system software, meta information of a player. Meta information is information representing a status or the like in game play. When the meta information is updated, the game software outputs, to the system software, the updated meta information. The system software generates player meta data by adding a user identifier (user account) for identifying the user, a game identifier (game ID) for identifying the game, and time information (a time stamp) to the meta information output from the game software, and transmits the player meta data to the server device.

The server device collects pieces of event data transmitted from a plurality of information processing devices operated by a plurality of players and analyzes the play trends related to an activity. For example, in reference to the pieces of event data transmitted from the plurality of information processing devices, the server device may statistically process lengths of playing time of the plurality of players for the activity. The server device has a function of notifying a user who has not yet played the relevant activity of estimated playing time, in reference to the result of statistical processing. By being notified of the estimated playing time, the user is able to determine whether or not the relevant activity can be completed within a limited period of time.

The server device also has a function of acquiring videos of a game displaying the game play actually performed by the plurality of players and using the videos as help videos that are to be used as a tip for playing the game. A help video is a video to which the user refers to accomplish an activity such as a quest or a mission. Using, as a help video, a game video (play video) displaying game play of a player actually accomplishing an activity reduces the time and effort of a game developer to create help videos for a huge amount of game scenes. When the user turns on a help function during game play, the information processing device which is a user terminal device acquires a help video related to the scene being played by the user from the server device and provides the help video to the user.

The help video provided at this time preferably matches the play style of the user. For example, in a battle game, various kinds of weapons are available. Providing a help video of taking down an enemy character with use of a melee weapon to a user who is using a ranged weapon would be of little use for reference purposes. Hence, the server device forms in advance a plurality of groups with different play styles and identifies to which of the groups the user's play style belongs, to allow an appropriate help video to be provided to the user.

FIG. 1 illustrates an information processing system 1 according to an embodiment of the present disclosure. The information processing system 1 according to the present embodiment is a game system for supporting game play of users and includes an information processing device 10 operated by a user who is a player and a server device 5. An access point (hereinafter referred to as an "AP") 8 has functions of a wireless access point and a router, and the information processing device 10 connects to the AP 8 in a wireless or wired manner and thereby connects to the server device 5 on a network 3 in a manner allowing communication therebetween. While FIG. 1 illustrates one user and one information processing device 10, the following description is based on a premise that, in the information processing system 1, a plurality of information processing devices 10 operated by a plurality of users and the server device 5 are connected to each other via the network 3.

The information processing device 10 is connected, in a wireless or wired manner, to an input device 6 operated by a user, and the input device 6 outputs information regarding an operation performed by the user to the information processing device 10. Upon receiving operation information from the input device 6, the information processing device 10 reflects the operation information in the processing of system software and game software and causes an output device 4 to output the result of processing. In the information processing system 1, the information processing device 10 is a game device (game console) for executing games, and the input device 6 may be a device that supplies information regarding an operation performed by the user to the information processing device 10 which may be a game controller, for example. Note that the input device 6 may be an input interface such as a keyboard or a mouse.

An auxiliary storage device 2 is a large-capacity recording device such as a hard disk drive (HDD) or a solid state drive (SSD), and may be a built-in recording device or an external recording device that is connected to the information processing device 10 by a universal serial bus (USB) or the like. The output device 4 may be a television set including a display for outputting images and a speaker for outputting sounds. The output device 4 may be connected to the information processing device 10 by a wired cable or may be connected thereto in a wireless manner.

A camera 7 which is an imaging device is provided in the vicinity of the output device 4 and captures an image of a space around the output device 4. While FIG. 1 illustrates an example in which the camera 7 is mounted to an upper part of the output device 4, the camera 7 may be disposed on a side part or a lower part of the output device 4; in any case, the camera 7 is disposed at a position where the camera 7 can capture an image of the user who is positioned in front of the output device 4. The camera 7 may be a stereo camera.

The server device 5 provides a network service to the users of the information processing system 1. The server device 5 manages network accounts (user accounts) for identifying the users, and each user uses the network account to sign in to the network service provided by the server device 5. By signing in to the network service from the information processing device 10, the user can register, in the server device 5, save data regarding a game or a trophy that is a virtual prize obtained during game play. By being registered in the server device 5, the save data and the trophies can be synchronized between devices even in a case where the user uses an information processing device different from the information processing device 10.

The server device 5 according to the present embodiment collects pieces of event data from a plurality of information processing devices 10 operated by a plurality of players. The server device 5 uses the collected pieces of event data to perform statistical processing on the playing time for an activity and evaluates, for each activity, the playing time corresponding to a player skill value that represents the skill of the user in the game play. Further, the server device 5 derives the player skill value of each user from the collected pieces of event data. The server device 5 can, in reference to the playing time for an activity corresponding to the player skill value and the player skill value of the user, notify the user who has not yet performed the relevant activity of the playing time corresponding to the player skill value of the user, as the estimated playing time. Upon being notified of the estimated playing time, the user can determine whether or not to play the activity according to his/her own situation (for example, the user has to go out in an hour later or other similar situations).

Figure 2:
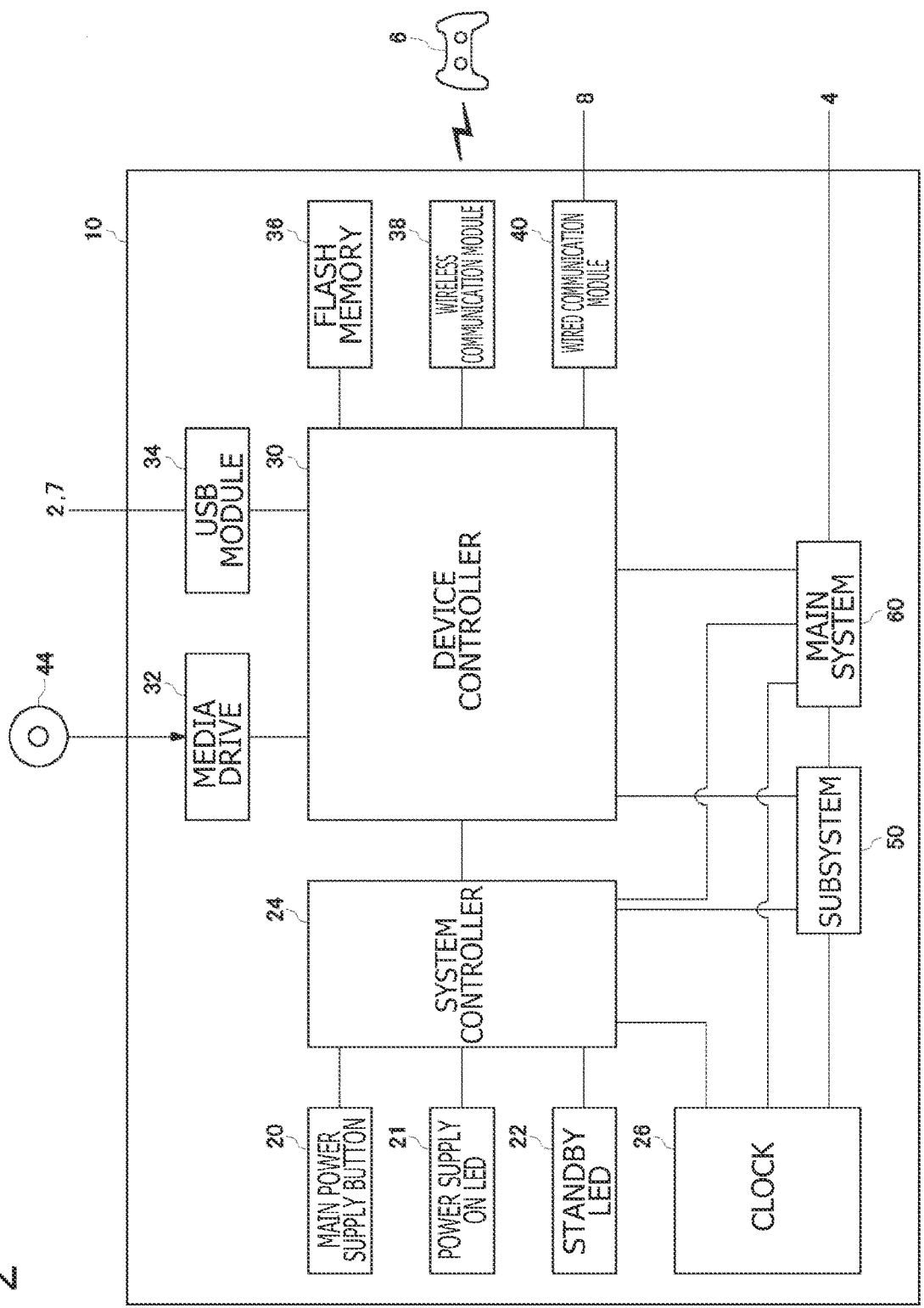
FIG. 2 is a diagram illustrating a hardware configuration of an information processing device.

FIG. 2 illustrates a hardware configuration of the information processing device 10. The information processing device 10 includes a main power supply button 20, a power supply ON light emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory which is a main storage device, a memory controller, a graphics processing unit (GPU), and the like. The GPU is mainly used for arithmetic processing of game programs. The main CPU has a function of activating the system software and executing the game programs installed in the auxiliary storage device 2, in an environment provided by the system software. The subsystem 50 includes a sub CPU, a memory which is a main storage device, a memory controller, and the like, but not the GPU.

While the main CPU has a function of executing the game programs installed in the auxiliary storage device 2, the sub CPU has no such function. However, the sub CPU has a function of accessing the auxiliary storage device 2 and a function of exchanging data with the server device 5. The sub CPU has only such limited processing functions, and can thus operate with small power consumption compared to the main CPU. These functions of the sub CPU are executed when the main CPU is in a standby state.

The main power supply button 20 is an input unit used by a user to perform an input operation. The main power supply button 20 is provided on a front surface of a housing of the information processing device 10 and is operated to turn on or off power supply to the main system 60 of the information processing device 10. The power supply ON LED 21 is lit when the main power supply button 20 is turned on, while the standby LED 22 is lit when the main power supply button 20 is turned off. The system controller 24 detects pressing down of the main power supply button 20 by the user.

The clock 26 is a real time clock and generates current date and time information. The clock 26 supplies the information to the system controller 24, the subsystem 50, and the main system 60.

The device controller 30 is configured as a large-scale integrated circuit (LSI) that executes information exchange between devices as a south bridge. As illustrated in FIG. 2, connected to the device controller 30 are such devices as the system controller 24, the media drive 32, the USB module 34, the flash memory 36, the wireless communication module 38, the wired communication module 40, the subsystem 50, and the main system 60. The device controller 30 absorbs the difference in electric property and data transfer speed among the devices and controls the timing of data transfer.

The media drive 32 is a drive device that is driven with a read only memory (ROM) medium 44 mounted thereto, the ROM medium 44 recording application software such as a game and license information, and reads out programs and data from the ROM medium 44. The ROM medium 44 is a read only recording medium as exemplified by an optical disk, a magneto-optical disk, and a Blu-ray disk.

The USB module 34 is a module connected to an external device by a USB cable. The USB module 34 may be connected to the auxiliary storage device 2 and the camera 7 by a USB cable. The flash memory 36 is an auxiliary storage device that configures an internal storage. The wireless communication module 38 is a communication protocol such as a Bluetooth (registered trademark) protocol and an Institute of Electrical and Electronics Engineers (IEEE) 802.11 protocol and wirelessly communicates with the input device 6. The wired communication module 40 performs wired communication with an external device and connects to the network 3 via the AP 8.

Figure 3:
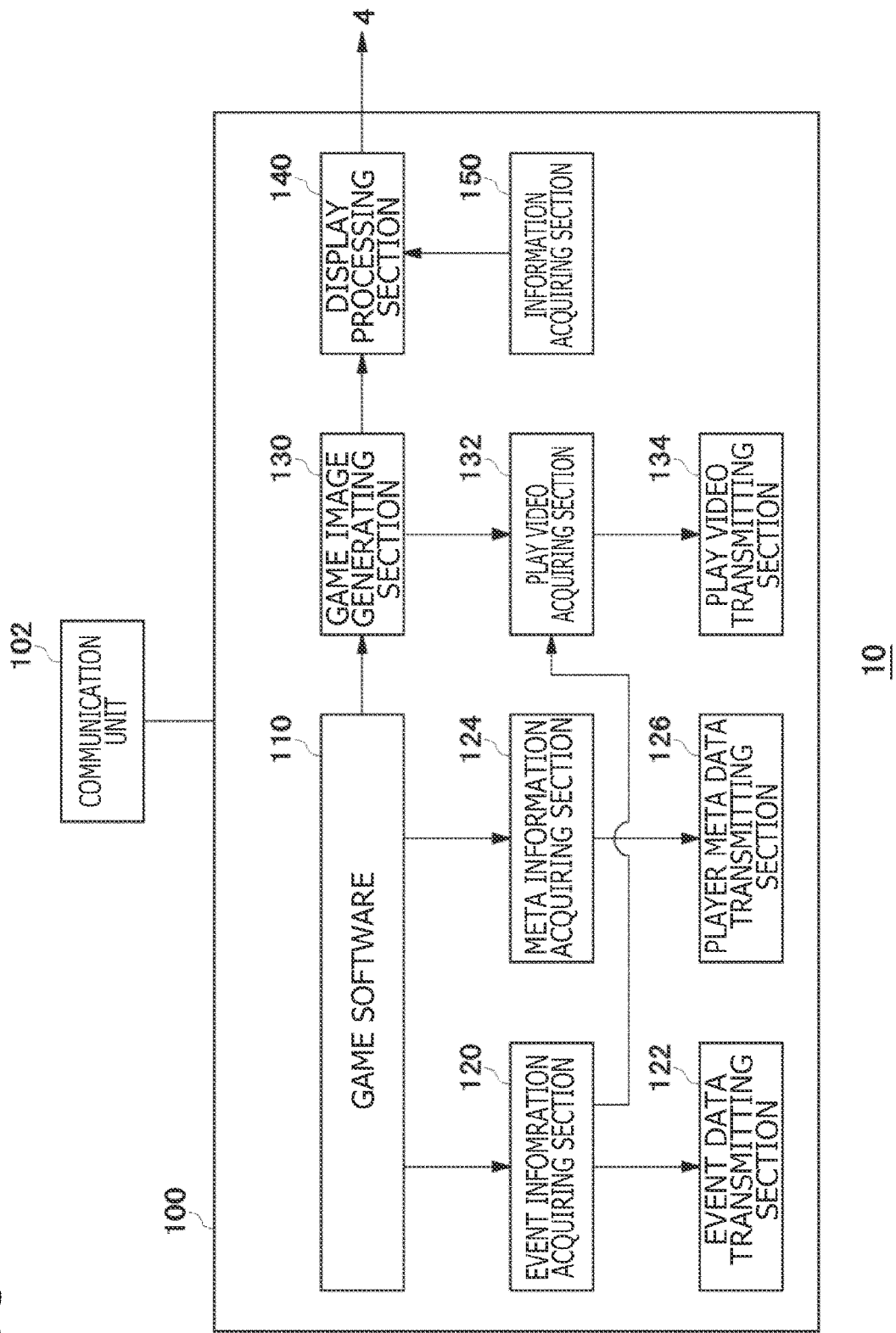
FIG. 3 is a diagram illustrating functional blocks of the information processing device.

FIG. 3 illustrates functional blocks of the information processing device 10. The information processing device 10 includes a processing unit 100 and a communication unit 102. The processing unit 100 includes game software 110, an event information acquiring section 120, an event data transmitting section 122, a meta information acquiring section 124, a player meta data transmitting section 126, a game image generating section 130, a play video acquiring section 132, a play video transmitting section 134, a display processing section 140, and an information acquiring section 150.

The information processing device 10 includes a computer, and various functions illustrated in FIG. 3 are implemented when the computer executes programs. The computer includes, as hardware, a memory to which programs are to be loaded, one or more processors that execute the programs loaded, an auxiliary storage device, other LSIs, and the like. The processor includes a plurality of electronic circuits including semiconductor integrated circuits and LSIs. The plurality of electronic circuits may be mounted onto one chip or may be mounted onto a plurality of chips. The functional blocks illustrated in FIG. 3 are implemented by cooperation between hardware and software. Accordingly, it should be understood by those skilled in the art that these functional blocks can be implemented in various forms including hardware only, software only, or a combination of the two.

The game software 110 includes at least a game program, image data, and sound data. The game program receives information regarding an operation of the input device 6 performed by the user and performs arithmetic operation for moving game characters in a virtual space. The game image generating section 130 includes a GPU for executing such processing as rendering processing and generates image data regarding the game. The display processing section 140 outputs the generated game image from the output device 4. The processing unit 100 includes a game sound generating section that generates game sound data and a sound outputting section that outputs a game sound, but they are omitted from illustration in FIG. 3.

When an activity is started in a game, the game program outputs event information indicating occurrence of a start event of the activity, and, when the activity is ended, the game program outputs event information indicating occurrence of an end event of the activity. The event information acquiring section 120, upon acquiring the event information from the game software 110, generates event data by adding the user account, the game ID, and time information (a time stamp) indicating the time of occurrence of an event to the event information, and provides the event data to the event data transmitting section 122. Note that the game program may output event information including the game ID and/or the time stamp to the event information acquiring section 120. The event data transmitting section 122 transmits the generated event data to the server device 5 via the communication unit 102.

Game developers may prepare various kinds of activities in a game. For example, in a case where a battle activity involving an enemy boss is incorporated in a game, the game program outputs event information including the activity ID for identifying the battle activity and information indicating a start of the battle activity, when the battle activity is started. When the player wins in the battle with the enemy boss, the game program outputs event information including the activity ID for identifying the battle activity, information indicating the end of the battle activity, and information indicating the success in the activity.

The event data transmitting section 122 transmits event data concerning the activity performed by the player to the server device 5 via the communication unit 102. In the information processing system 1, the process of transmitting event data is performed by all of the information processing devices 10 connected to the server device 5, and the server device 5 collects pieces of event data concerning various kinds of activities included in various kinds of games from the plurality of information processing devices 10. Preferably, the event information acquiring section 120, upon acquiring the event information from the game software 110, promptly generates event data to which a time stamp is added, and the event data transmitting section 122 transmits the event data to the server device 5.

The game program outputs meta information of a player in a game. Meta information is information representing the status of a player in game play, and may include, for example, a character being used by the player, weapons or items being equipped, level of difficulty of the quest or mission, a player level indicating the degree of skill, and the like. The game program outputs updated meta information when the meta information is updated (for example, when the player changes the weapon). In the embodiment, the meta information is used as an indicator for assessing the play style of the player.

Upon acquiring the meta information from the game software 110, the meta information acquiring section 124 generates player meta data by adding the user account, the game ID, and time information indicating the time of update of the meta information (a time stamp) to the meta information, and provides the player meta data to the player meta data transmitting section 126. Note that the game program may output meta information including the game ID and/or the time stamp to the meta information acquiring section 124. The player meta data transmitting section 126 transmits the generated player meta data to the server device 5 via the communication unit 102.

The play video acquiring section 132 includes a ring buffer and has a function of recording an image displayed on the output device 4 in the ring buffer in the background. A ring buffer allows cyclic use of a memory region by logically coupling an end and a head. The ring buffer may be generated by a start address and an end address of a storage region of the auxiliary storage device 2 being set. The play video acquiring section 132 records the game image data in the ring buffer in the order of address determined beforehand, from the start address. When recording has reached the end address, the play video acquiring section 132 returns to the start address to perform overwriting recording and repeats such processes. For example, the ring buffer records a maximum 30-minute play video, which means that the ring buffer has recorded therein a play video for the past 30 minutes from the current time. To the recorded play video, time information (a time stamp) is added.

The play video acquiring section 132 may have a function of automatically clipping and acquiring the play videos recorded in the ring buffer. For example, when the battle activity involving the enemy boss has ended (when the player has won the battle with the enemy boss), upon acquisition of the event information indicating the end of the battle activity by the event information acquiring section 120, the play video acquiring section 132 may automatically read out (clip), from the ring buffer, the play video of a predetermined period of time including the end of the event and record the play video in the auxiliary storage device 2. At this time, the play video acquiring section 132 may automatically read out the play video for the period from a time that is first time (for example, a few minutes) prior to the end of the event to a time of end of the event or automatically read out the play video for the period from a time that is first time (for example, a few minutes) prior to the end of the event to a time that is a second time (for example, a few seconds) after the end of the event.

Implementation of the function of automatically acquiring play videos by the play video acquiring section 132 is based on the premise that the user has given permission to posting the user's play video to the server device 5 as a help video. The game developer can set in advance an activity for which a play video can automatically be acquired. This prevents the function of automatically acquiring play videos from being implemented for activities for which the game developer does not want to provide a help video from the viewpoint of preventing spoilers. Note that the play video acquiring section 132 may read out the play video recorded in the ring buffer, in accordance with an instruction from the user, and record the play video in the auxiliary storage device 2. At this time, the user preferably clips a desired scene from the 30-minute play video recorded in the ring buffer and edits the play video to one with a predetermined period of time or less.

The play video transmitting section 134 transmits the play video acquired by the play video acquiring section 132 to the server device 5 via the communication unit 102. When the user uses the input device 6 and inputs an upload instruction for the play video to the information processing device 10, the play video transmitting section 134 transmits the play video to which the user account and the game ID are added to the server device 5. At this time, the play video transmitting section 134 may add meta information of the player generated or updated upon generation of the play video to the play video. Note that, in a case where the user has permitted posting of the user's play video as a help video, the play video transmitting section 134 may, upon acquisition of the play video by the play video acquiring section 132, automatically transmit the play video to which the user account, the game ID, and the meta information are added to the server device 5.

Figure 4:
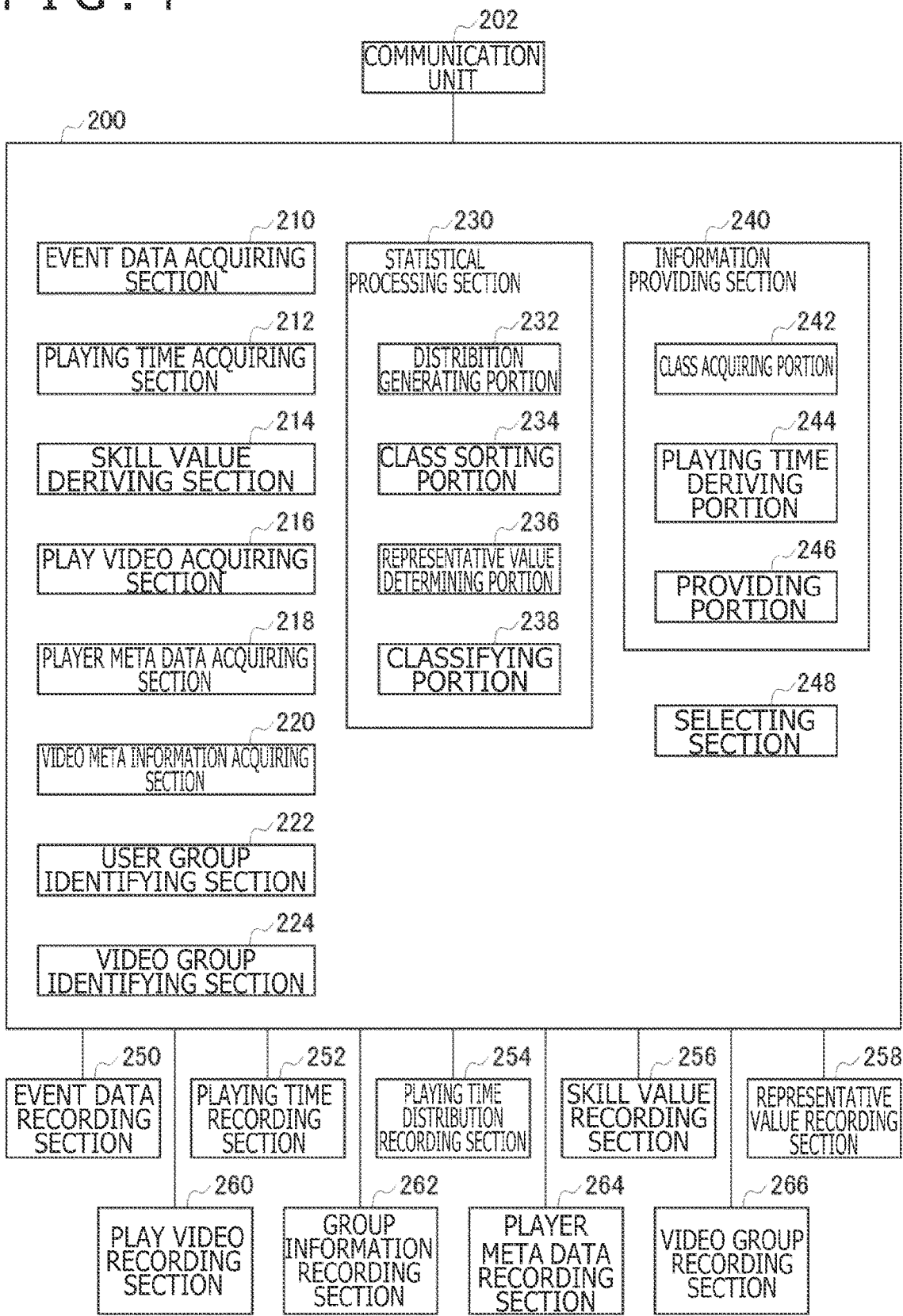
FIG. 4 is a diagram illustrating functional blocks of a server device.

FIG. 4 illustrates functional blocks of the server device 5 according to the present embodiment. The server device 5 includes a processing unit 200, a communication unit 202, an event data recording section 250, a playing time recording section 252, a playing time distribution recording section 254, a skill value recording section 256, a representative value recording section 258, a play video recording section 260, a group information recording section 262, a player meta data recording section 264, and a video group recording section 266. The processing unit 200 includes an event data acquiring section 210, a playing time acquiring section 212, a skill value deriving section 214, a play video acquiring section 216, a player meta data acquiring section 218, a video meta information acquiring section 220, a user group identifying section 222, a video group identifying section 224, a statistical processing section 230, an information providing section 240, and a selecting section 248. The statistical processing section 230 includes a distribution generating portion 232, a class sorting portion 234, a representative value determining portion 236, and a classifying portion 238. The information providing section 240 includes a class acquiring portion 242, a playing time extracting portion 244, and a providing portion 246.

The server device 5 includes a computer, and various functions illustrated in FIG. 4 are implemented when the computer executes programs. The computer includes, as hardware, a memory to which programs are to be loaded, one or more processors that execute the programs loaded, an auxiliary storage device, other LSIs, and the like. The processor includes a plurality of electronic circuits including semiconductor integrated circuits and LSIs. The plurality of electronic circuits may be mounted onto one chip or may be mounted onto a plurality of chips. The functional blocks illustrated in FIG. 4 are implemented by cooperation between hardware and software. Accordingly, it should be understood by those skilled in the art that these functional blocks can be implemented in various forms including hardware only, software only, or a combination of the two.

The event data acquiring section 210 acquires, from the plurality of information processing devices 10, pieces of event data concerning an activity performed by a plurality of players and records the pieces of event data in the event data recording section 250. The event data recording section 250 records the pieces of event data for each game title in association with the player's network account. As described above, the event data includes at least the game ID, the activity ID, information indicating the start or end of the activity, and a time stamp. In the following description, the process of analyzing the collected pieces of event data by the server device 5 will be described.

Figure 5:
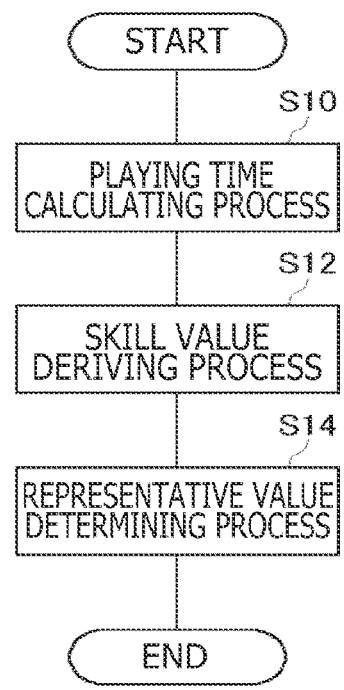
FIG. 5 is a diagram illustrating a process for analyzing collected pieces of event data.

FIG. 5 illustrates a process for analyzing the collected pieces of event data. Analyzing the pieces of event data includes a playing time calculating process (S10) to be performed by the playing time acquiring section 212, a skill value deriving process (S12) to be performed by the skill value deriving section 214, and a representative value determining process (S14) to be performed by the representative value determining portion 236.

<S10: Playing Time Calculating Process>

The playing time acquiring section 212 acquires the playing time for an activity. The playing time acquiring section 212 acquires the lengths of playing time of a plurality of players for the activity from the pieces of event data including activity start event information (start event data) and event data including activity end event information (end event data) that are recorded in the event data recording section 250. Playing time for an activity is calculated in reference to the time stamp included in the start event data and the time stamp included in the end event data.

Figure 6:
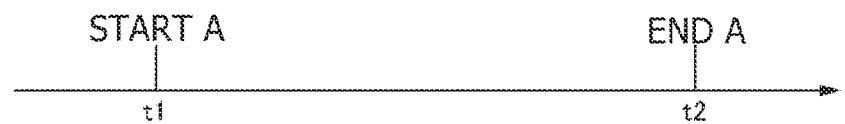
FIG. 6 is a diagram used for describing a method for calculating playing time.

FIG. 6 is a diagram used for describing the method for calculating the playing time. FIG. 6 illustrates a start event and an end event of an activity A performed by one player. Specifically, "Start A" indicates the start event of the activity A, while "End A" indicates the end event of the activity A. The start event data includes a start time t1 of the activity A, while the end event data includes an end time t2 of the activity A. The playing time acquiring section 212 calculates the playing time of the player for the activity A to be (t2−t1). The playing time acquiring section 212 records, together with the game ID and the activity ID, the calculated playing time for the activity in the playing time recording section 252 in association with the player's network account. The playing time acquiring section 212 analyzes the pieces of the event data of the plurality of players, acquires the playing time for each of the plurality of activities for each player, and records the lengths of playing time in the playing time recording section 252.

<S12: Skill Value Deriving Process>

In the statistical processing section 230, the distribution generating portion 232 generates the distribution of playing time for each activity, in reference to the plurality of lengths of playing time acquired by the playing time acquiring section 212. The distribution generating portion 232 records the distribution of playing time generated for each activity in the playing time distribution recording section 254.

FIG. 7A and FIG. 7B each illustrate a distribution curve representing the relation between the playing time for one activity and the number of players who have performed the activity. The axis of abscissa indicates the playing time, while the axis of ordinate indicates the number of players. FIG. 7A illustrates the relation between the playing time for the activity A and the number of players thereof, while FIG. 7B illustrates the relation between the playing time for the activity B and the number of players thereof.

The server device 5 implements a technique of deriving a skill value obtained by assessing the skill of a user and notifying the user of the playing time corresponding to the derived skill value, based on such a knowledge that there is a correspondence between the playing time for an activity and the user's skill in playing games. Based on this knowledge, users with high game skill complete an activity in a relatively short length of playing time, while users with low game skill complete the activity in a relatively long length of playing time. Hence, it is predicted that, if the user has high game skill, both the activity A and the activity B are completed in short playing time, but if the user has low game skill, both the activity A and the activity B are completed in long playing time.

FIGS. 8A and 8B each illustrate a distribution of playing time. The distribution generating portion 232 lists, for each activity, all the players in terms of playing time in ascending order and classifies all the players into a plurality of groups in such a manner that each group includes the same number of players. In the present embodiment, the distribution generating portion 232 classifies all the players into a total of ten groups, i.e., group 1 to group 10, each group including the same number of players. In a case where the number of players who have played the activity A is one million, each group includes 100 thousand players, with group 1 being a group in which players with the shortest playing time are gathered and group 10 being a group in which players with the longest playing time are gathered. The distribution generating portion 232 records the distribution of playing time generated for each activity in the playing time distribution recording section 254. For example, the playing time distribution recording section 254 may record, as the distribution of playing time, the group numbers ranging from 1 to 10, in association with the shortest length of playing time and the longest length of playing time included in each group.

The skill value deriving section 214 derives the skill value of a user for the relevant activity, in reference to the playing time of the user for the activity and distribution of playing time for the relevant activity. The skill value deriving section 214 refers to the distribution of playing time recorded in the playing time distribution recording section 254 and identifies the group number of the group in which the playing time of the user would be included, to thereby derive the skill value of the user for the activity. In the present embodiment, the group number per se may represent the skill value. Accordingly, the skill value deriving section 214 derives, when the playing time of the user who has performed the activity A is included in the group with the group number 3, number "3" as the skill value of the user for the activity A, and, when the playing time of the user who has performed the activity B is included in the group with the group number 5, number "5" as the skill value of the user for the activity B. In the present embodiment, the skill value 1 indicates the highest skill level, while the skill value 10 indicates the lowest skill level. The skill value deriving section 214 records the skill values derived for all the activities played by the user, in association with the network account of the user (player), in the skill value recording section 256.

The skill value deriving section 214 derives the skill value of the user concerning the game play, in reference to the plurality of skill values derived for a plurality of activities. Specifically, the skill value deriving section 214 derives the skill values of the user for the plurality of activities most recently played by the user, averages the plurality of derived skill values, and derives the skill value of the user concerning the game play. In the present embodiment, the skill value deriving section 214 averages 10 skill values derived for the most recently played 10 activities and derives the skill value of the user concerning the game play. In the following description, the skill value of the user concerning the game play is sometimes referred to as a "player skill value."

The following description illustrates a specific example in which the player skill value of a user X is derived. It is to be noted that the numerical values illustrated in the specific example may include numerical values that deviate from the knowledge described above but they are mere examples for describing the present embodiment.

The group numbers of the groups that include the lengths of playing time for the 10 activities most recently played the user X are as follows.

Activity A: group number 3
Activity B: group number 5
Activity C: group number 1
Activity D: group number 2
Activity E: group number 4
Activity F: group number 7
Activity G: group number 5
Activity H: group number 5
Activity I: group number 8
Activity J: group number 10

Since the skill values are represented by the group numbers, the skill values of the user for the activities are derived as follows.

Activity A: skill value 3
Activity B: skill value 5
Activity C: skill value 1
Activity D: skill value 2
Activity E: skill value 4
Activity F: skill value 7
Activity G: skill value 5
Activity H: skill value 5
Activity I: skill value 8
Activity J: skill value 10

The skill value deriving section 214 averages the skill values derived for the 10 activities and derives the player skill value of the user X.

(Player skill value)=(3+5+1+2+4+7+5+5+8+10)/10=5

In the manner described above, with the skill values derived for the most recently played 10 activities averaged, the player skill value of the user X is derived to be "5."

The skill value deriving section 214 derives the player skill values of all users and records the player skill values in the skill value recording section 256. The player skill value takes a value within the range of 1 to 10, with 1 as the minimum value and 10 as the maximum value. It can thus be said that users with smaller player skill values have higher game skill while users with larger player skill values have lower game skill.

As described above, the skill value deriving section 214 derives the player skill value in reference to the skill values derived for a predetermined number of activities that have most recently been played. The skill value deriving section 214 may update the player skill value of the user every time the user performs an activity, but may alternatively update the player skill value periodically, for example, once a day.

<S14: Representative Value Determining Process>

In the statistical processing section 230, the class sorting portion 234 sets a plurality of classes and sorts the player into any one of the plurality of classes according to the player skill value of the player. In the present embodiment, the class sorting portion 234 sets 9 classes and performs the sorting process of the users in accordance with the following rules. PS represents the player skill value.

$1 \leq PS \leq 2$: class 1
$2 < PS \leq 3$: class 2
$3 < PS \leq 4$: class 3
$4 < PS \leq 5$: class 4
$5 < PS \leq 6$: class 5
$6 < PS \leq 7$: class 6
$7 < PS \leq 8$: class 7
$8 < PS \leq 9$: class 8
$9 < PS \leq 10$: class 9

The user X having the player skill value "5" is sorted into class 4 by the class sorting portion 234. The class sorting portion 234 sorts all the users participating in the information processing system 1 into any one of the classes 1 to 9 according to their player skill values, and records the classes of the users in the skill value recording section 256.

Figure 9:
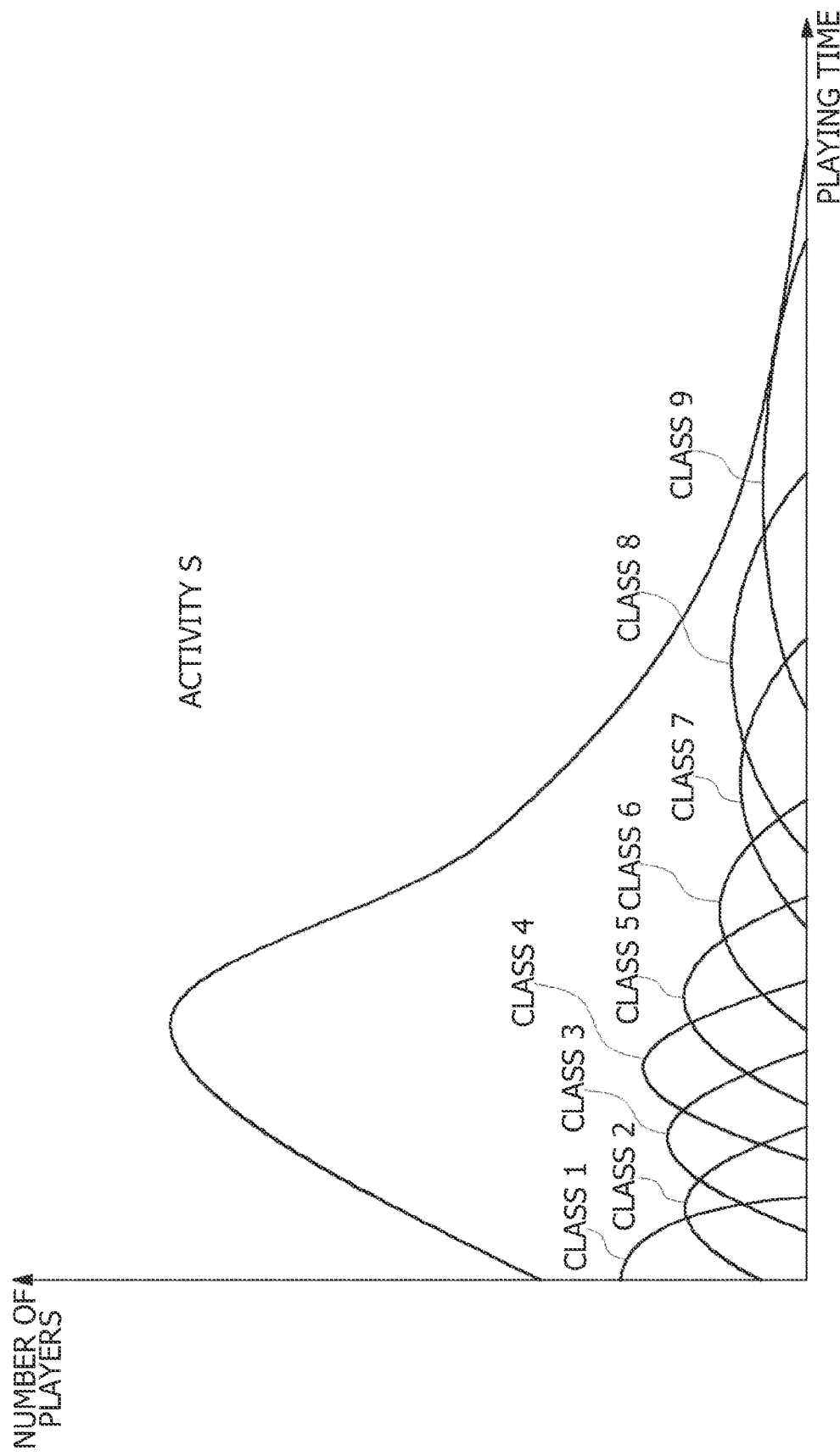
FIG. 9 is a diagram illustrating a graph in which players are plotted for each class.

FIG. 9 illustrates a graph in which the players are plotted for each class in a distribution curve indicating the relation between the playing time for an activity S and the number of players thereof. The graph of class 1 indicates the relation between the lengths of playing time of the plurality of players belonging to class 1 and the number of players thereof, while the graph of class 2 indicates the relation between the lengths of playing time of a plurality of players belonging to class 2 and the number of players thereof. That is, the graph of class N (which is an integer of 1 to 9) represents the relation between the lengths of playing time of the plurality of players belonging to class N and the number of players. Accordingly, adding up the graphs of all the classes 1 to 9 produces a distribution curve indicating the relation between the lengths of playing time of all users for the activity S and the number of players thereof. Note that the number of players belonging to each class may be different between classes.

The representative value determining portion 236 determines, for each activity, a representative value of the playing time in each class, in reference to the lengths of playing time of the plurality of players in each class. The representative value determining portion 236 may derive, as the representative value of each class, a median value of the plurality of lengths of playing time in each class. The representative value determining portion 236 determines the representative value (medN) of the playing time in each class as follows.

Class 1: med1
Class 2: med2
Class 3: med3
Class 4: med4
Class 5: med5
Class 6: med6
Class 7: med7
Class 8: med8
Class 9: med9

The representative value of the playing time determined for each class may be provided to the user who has not yet performed the activity, as the estimated playing time. In a case where the user X who belongs to class 4 has not yet performed the activity S, the server device 5 may notify the user X that the estimated playing time of the user X for the activity S is "med4."

The representative value determining portion 236 determines the representative value for each of the classes 1 to 9 for all of the activities, and records the representative values in association with the classes in the representative value recording section 258. In the present embodiment, the representative value is a median value, but may alternatively be an average value or a mode value. The representative value determining portion 236 may perform the representative value determining process periodically, for example, once a day. This completes the description regarding the analysis process for the event data in the present embodiment.

The information providing section 240 may notify the user who is operating the information processing device 10 of the estimated playing time for the activity which the user has not yet performed. Specifically, the information providing section 240 notifies the user of the representative value of the playing time associated with the class of the user or the length of time based on the representative value, as the estimated playing time. The information providing section 240 may notify the user of the estimated playing time at any desired timing.

The class acquiring portion 242 acquires, from the skill value recording section 256, the class to which the user operating the information processing devices 10 belongs. For example, when the user X logs in to the information processing device 10, the class acquiring portion 242 may acquire the class to which the user X who has logged in belongs from the skill value recording section 256. The playing time extracting portion 244 extracts, for the activity which the user X can perform, the representative value of the playing time associated with the class of the user X from the representative value recording section 258. The providing portion 246 notifies the information processing device 10 of the user X of information concerning the estimated playing time based on the extracted representative value of the playing time. Note that the estimated playing time based on the representative value of the playing time may be the representative value of the playing time per se, but may alternatively be a length of time obtained by slight adjustment to the representative value of the playing time. For example, in a case where the representative value of the playing time is 4.9 minutes, the providing portion 246 may use a nice round number (for example, 5 minutes) as the estimated playing time. The providing portion 246 may notify the information processing device 10 of the user X of information concerning the estimated lengths of playing time for a plurality of activities.

In the information processing device 10, the information acquiring section 150 acquires, from the server device 5, information concerning the estimated playing time for an activity. The display processing section 140 displays the information acquired by the information acquiring section 150.

Figure 10:
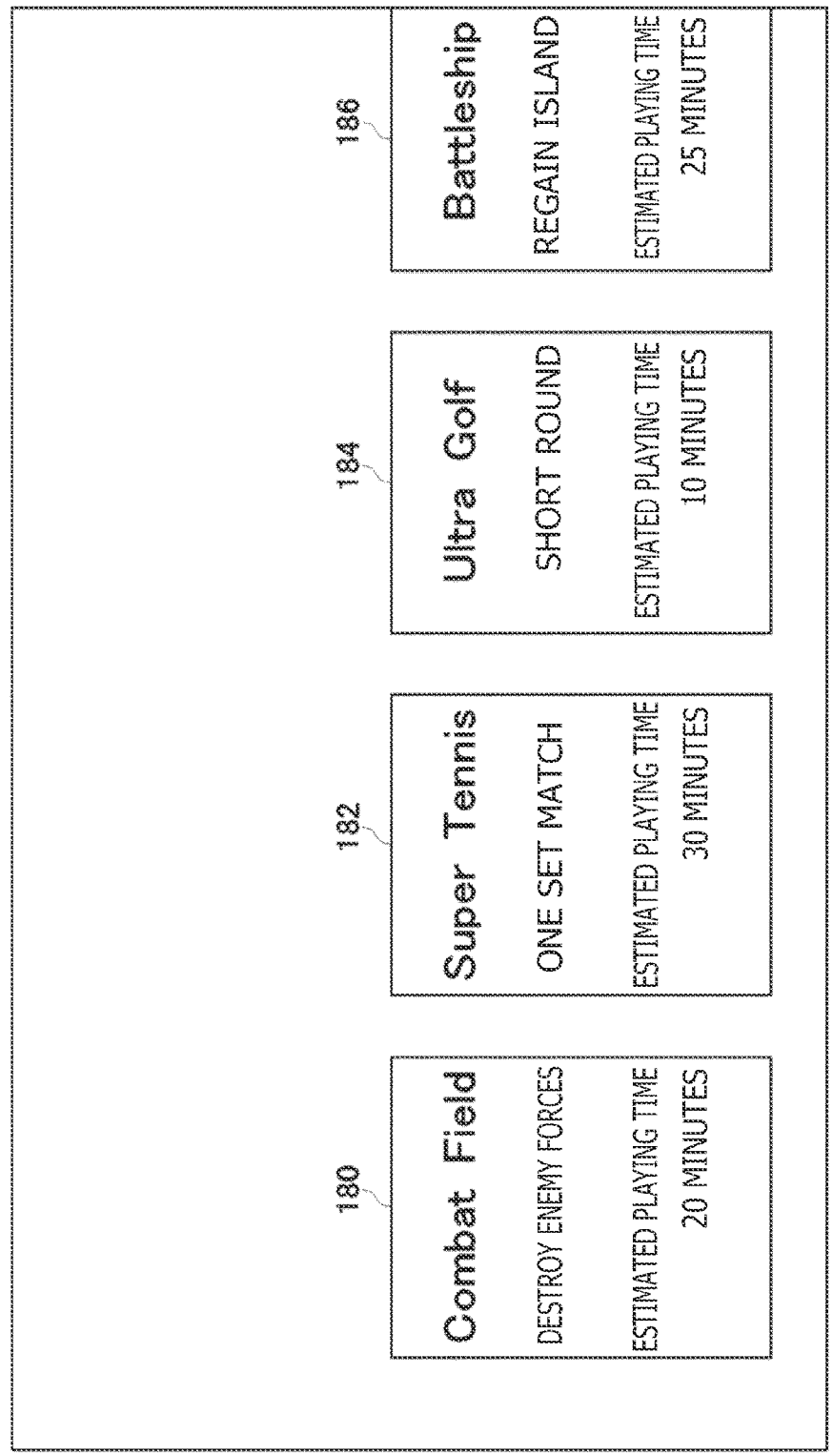
FIG. 10 is a diagram illustrating an example of a system screen.

FIG. 10 illustrates an example of a system screen displayed on the output device 4. The display processing section 140 generates system images 180, 182, 184, and 186 from the information acquired by the information acquiring section 150, and displays the system images on the output device 4. The four system images 180, 182, 184, and 186 each display the estimated playing time for an activity in a different game title. This allows the user X to use the estimated playing time for each activity to determine which game to play.

The system images 180, 182, 184, and 186 that are displayed in a card format may be a graphical user interface (GUI). For example, when the user X selects any one of the system images, the game corresponding to the system image may automatically be launched.

<Statistical Processing for Each Play Style>

In the embodiment described above, there has been described an example in which the statistical processing section 230 collectively performs statistical processing without distinguishing the pieces of event data regarding all the players in the information processing system 1. However, players exhibit diverse play styles, and, for example, even if a player who uses a ranged weapon and a player who uses a melee weapon in a battle activity demonstrate almost the same average skill in a game, it is possible that a difference occurs in the length of time taken to complete the activity due to the difference in the weapon used.

As such, the server device 5 may generate a group for each play style and perform statistical processing on the pieces of event data for each group to thereby provide the user with information that matches with his/her play style. Specifically, the server device 5 may generate a plurality of groups with different play styles and statistically process the lengths of playing time of the plurality of players belonging to each group for the activity, to thereby enable notification of the estimated playing time that matches with the play style.

In the embodiment below, the statistical processing section 230 generates a plurality of groups with different play styles, with use of pieces of meta information of a plurality of players, and performs statistical processing for each group with a different play style. Accordingly, when the estimated playing time for the activity is to be presented to the user X, the playing time extracting portion 244 extracts the representative value of the appropriate playing time that matches with the skill of the user X, by identifying the class of the user X in the play style group to which the user X belongs.

Figure 11:
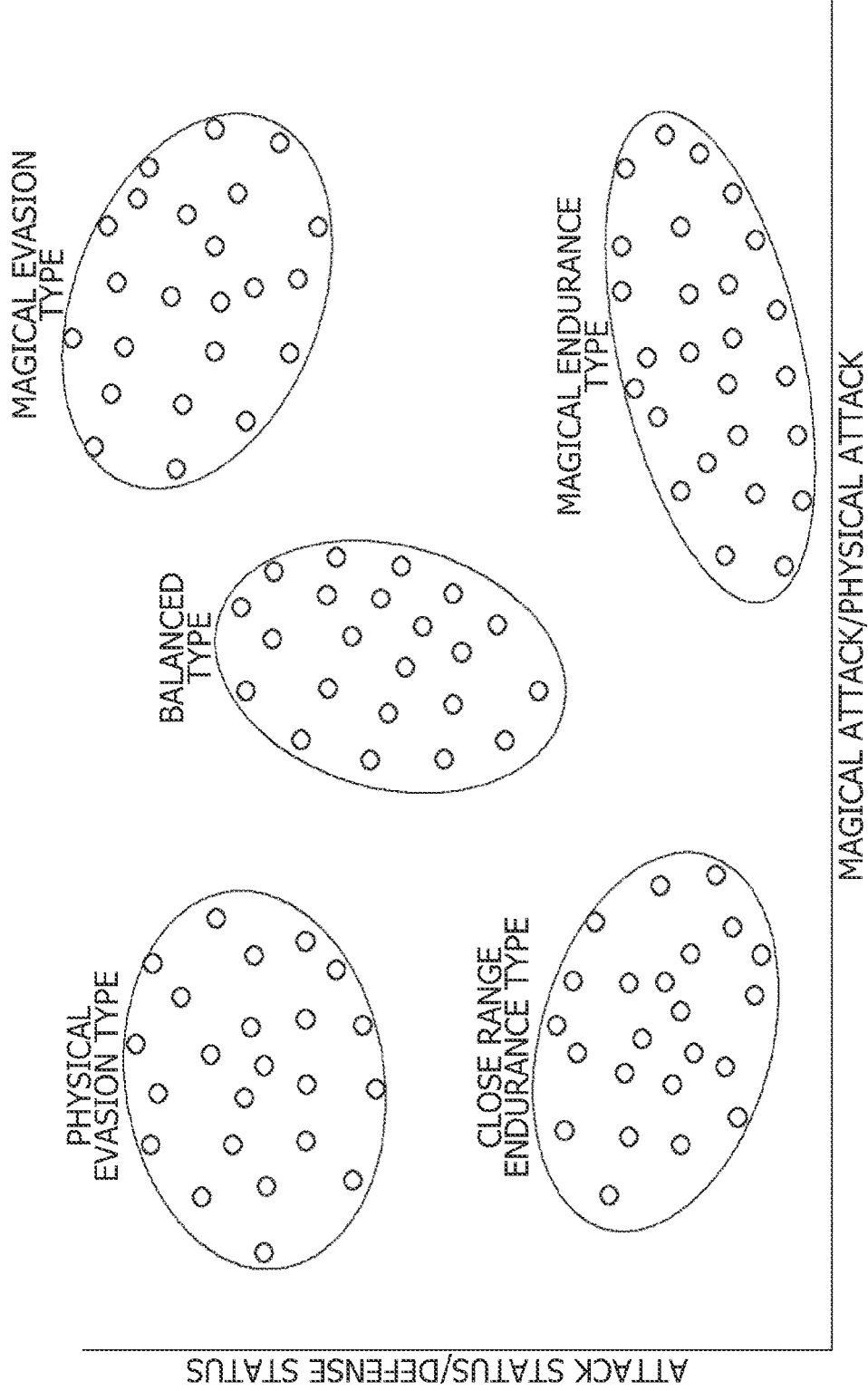
FIG. 11 is a diagram illustrating an example of a plurality of groups with different play styles.

FIG. 11 illustrates an example of a plurality of groups with different play styles. The plurality of groups illustrated in FIG. 11 are generated by the plurality of players being subjected to clustering based on "attack status/defense status" and "magical attack/physical attack." Note that the result of clustering illustrated in FIG. 11 is one generated in reference to a simple parameter (meta information) for illustration, and in practice, numerous groups may be generated by the play styles being fragmented into small groups with use of three or more parameters (meta information).

In the server device 5, the player meta data acquiring section 218 acquires, from a plurality of information processing devices 10, pieces of player meta data of a plurality of players and records the acquired pieces of player meta data in the player meta data recording section 264. As described above, the player meta data includes the game ID and the meta information, and the meta information may include, for example, the attribute of the character used by the player, equipped weapons or items, level of difficulty of the quest or mission, the player level indicating the skill level, and the like. The "attack status/defense status" and "magical attack/physical attack" illustrated in FIG. 11 are examples of information derived from the attribute of the character, equipped weapons or items, and the like.

The classifying portion 238 has a function of generating a plurality of groups with different play styles. Specifically, the classifying portion 238 uses the pieces of meta information of the plurality of players that are recorded in the player meta data recording section 264, to generate a plurality of groups with different play styles. The classifying portion 238 groups the players in reference to the degree of similarity in meta information, and hence, the generated group includes an assemblage of players with the same or similar play style. Accordingly, in the same group, players with high skill are likely to complete an activity in a relatively short length of playing time, while players with low skill are likely to complete the activity in a relatively long length of playing time.

The classifying portion 238 performs N-dimension clustering with use of N pieces of meta information, to generate a plurality of groups exhibiting a plurality of play styles. The classifying portion 238 calculates the median point of each group after generating a plurality of groups, and records the median points in the group information recording section 262. The classifying portion 238 may perform the group generation process periodically, for example, once a day.

In the present embodiment, a procedure for performing statistical processing on the pieces of event data concerning all the players in the information processing system 1 by the statistical processing section 230 has been described with reference to FIG. 5. In a case where the classifying portion 238 generates a plurality of groups concerning play styles as described above, the statistical processing section 230 may classify all the players in the information processing system 1 into any of the groups and perform, for each group, statistical processing on the pieces of event data concerning the players included in each group. Accordingly, the representative value determining portion 236 determines, for each group concerning the play style, a representative value for each of the classes 1 to 9 for all the activities and records the representative values in association with the classes in the representative value recording section 258.

When the user X is playing a game, the player meta data acquiring section 218 acquires the player meta data of the user X. The user group identifying section 222 calculates a distance between the meta information of the user X and the median point of each group recorded in the group information recording section 262, and identifies the group with the closest distance to the meta information of the user X, as the group to which the user X belongs. The information providing section 240 may provide the user X with information concerning the group to which the user X belongs. For example, the information providing section 240 may notify the user X of the estimated playing time for an activity which the user X has not yet performed. The information acquiring section 150 may acquire the information concerning the group to which the user X belongs, and the display processing section 140 may generate system images (see FIG. 10) from the information acquired by the information acquiring section 150 and display the system images on the output device 4.

The class acquiring portion 242 acquires the class to which the user X belongs from the skill value recording section 256. For example, when the user X logs in to the information processing device 10, the class acquiring portion 242 may acquire the class to which the user X who has logged in belongs, from the skill value recording section 256. The playing time extracting portion 244 extracts, from the representative value recording section 258, the representative value of the playing time associated with the group concerning the play style and the class of the user X, for the activity which the user X can perform. As described above, the representative value recording section 258 records, for each group concerning the play style, the representative values of each of the classes 1 to 9 for all of the activities. The providing portion 246 notifies the information processing device 10 of the user X of information concerning the estimated playing time based on the extracted representative value of the playing time. In this manner, the providing portion 246 provides the user X with the estimated playing time derived in reference to the skill values in the play style group to which the user X belongs, so that the user X can use as a reference the estimated playing time that matches with the play style of the user X him/herself.

<Help Video Providing Function>

The server device 5 according to the present embodiment may have a function of providing the user with a help video that matches with the play style of the user.

The play video acquiring section 216 acquires, from the plurality of information processing devices 10, play videos permitted to be used as help videos, and records the play videos in the play video recording section 260. The video meta information acquiring section 220 acquires the meta information of the play video. Note that the meta information of the play video is meta information of a player that is obtained when the player has performed the game play recorded in the play video. In the information processing device 10, in a case where the play video transmitting section 134 has transmitted a play video to which meta information is added to the server device 5, the video meta information acquiring section 220 acquires the meta information added to the play video. Note that, in a case where meta information is not added to the play video, the video meta information acquiring section 220 identifies, from the time stamp included in the player meta data recorded in the player meta data recording section 264 and the time stamp of the play video, the meta information of the player during the time period from the start of the play video to the end thereof, to acquire the meta information of the play video.

The video group identifying section 224 uses the meta information of the play video to identify the group with the play style with which the relevant play video can be associated. The video group identifying section 224 calculates a distance between the meta information of the play video and the median point of each group recorded in the group information recording section 262 and identifies, as the group with which the relevant play video can be associated, the group with the closest distance to the meta information of the play video. The video group identifying section 224 records the information (group ID) indicating the group that can be associated with the play video, in the video group recording section 266.

Figure 12:
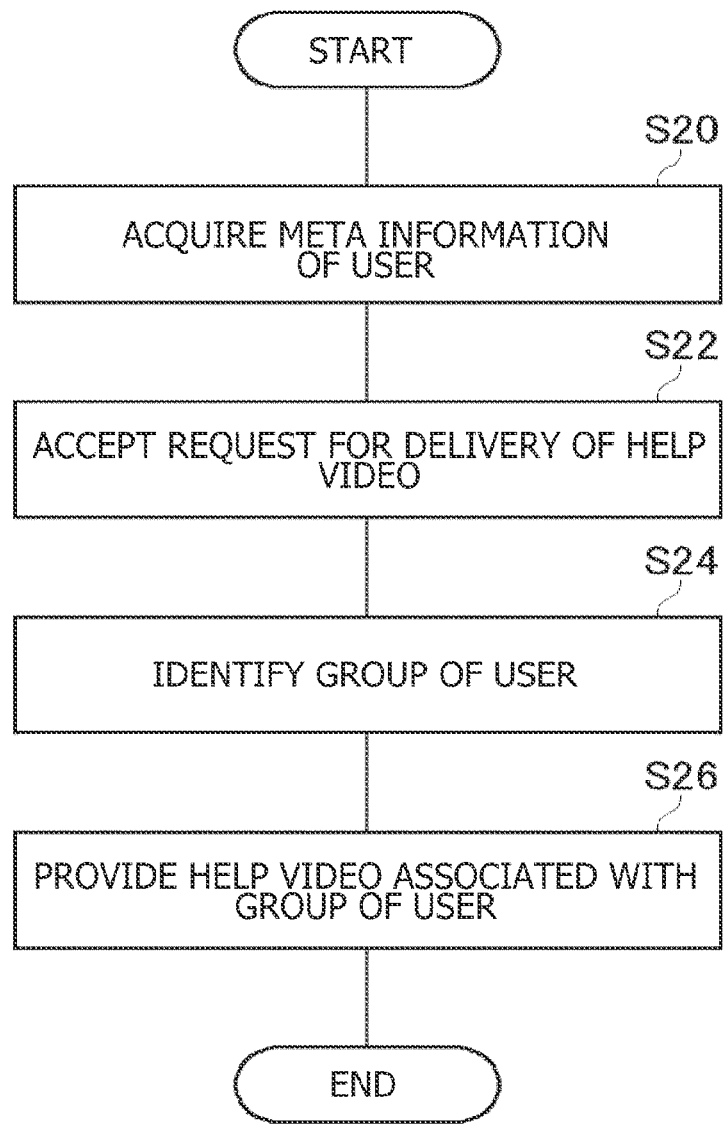
FIG. 12 is a diagram illustrating a flowchart for providing a help video to a user.

FIG. 12 illustrates a flowchart for providing a help video to a user. When the user is playing a game, the player meta data acquiring section 218 acquires the player meta data of the user and records the player meta data in the player meta data recording section 264 (S20). When the user transmits, to the server device 5, a request for delivery of a help video, the server device 5 accepts the request for delivery (S22), and the user group identifying section 222 identifies the group to which the user belongs (S24). Specifically, the user group identifying section 222 calculates a distance between the current meta information of the user and the median point of each group recorded in the group information recording section 262 and identifies the group with the closest distance, as the group to which the user belongs.

The providing portion 246 refers to the video group recording section 266, identifies the play video that can be associated with the group to which the user belongs, reads out the identified play video from the play video recording section 260, and provides the play video to the user via the communication unit 202 (S26). In the information processing device 10, the information acquiring section 150 acquires the play video provided from the server device 5, and the display processing section 140 displays the play video (help video) on the output device 4. This allows the user to view the help video that matches with his/her play style and use the help video as a reference for playing the game.

Note that the play video acquiring section 216 records all of the acquired play videos in the play video recording section 260, so that the play video recording section 260 has a great volume of play videos recorded therein. While the play video which is to be used as a help video should have a good play recorded therein, a play video with an excessively great play being recorded therein would be of little use for reference purposes (little use for copying purposes), so that a play video in which a moderately good play is recorded is appropriate as a help video.

From such a viewpoint, the selecting section 248 selects, from among the play videos recorded in the play video recording section 260, a play video to be provided to the user, that is, a play video available as a help video. The selecting section 248 may select the play video in reference to the skill value of the player who generated the play video.

As described above, the skill value deriving section 214 derives, on a scale of 1 to 10, the skill value of the player for an activity, in reference to the playing time of the player for the activity and the distribution of playing time for the activity. In the present embodiment, the skill value 1 indicates the highest skill level, while the skill value 10 indicates the lowest skill level. Accordingly, the selecting section 248 may select the play video with the skill value of 3 or 4 for the activity related to the play video. The skill value being 3 or 4 for the activity means that the player has completed the activity in a skillful way but not in an excessively skillful way (the skill value being 1 or 2 indicates that player is too skillful). The selecting section 248 adopts the play video with the skill value of 3 or 4 as the help video to allow the providing portion 246 to provide the user with a play video meeting the needs of the user. For example, the selecting section 248 may add a flag to the play video that is to be adopted as the help video, and the providing portion 246 may provide the user with the play video to which a flag is added.

The present disclosure has been described above in reference to the embodiment. The present embodiment is an example, which means that a person ordinally skilled the art would understand that various modifications are available for the combination of constituent elements and processing processes of the embodiment and that those modifications also fall within the scope of the present disclosure.

The user who has been provided with the help video can transmit to the server device 5 an evaluation regarding the help video. The server device 5 may collect evaluations regarding help videos and preferentially provide highly evaluated help videos. Note that the server device 5 may increase the player's motivation for posting help videos, by giving points or titles to the players who have generated highly evaluated help videos.

According to the present embodiment, it has been described that, in the server device 5, the play video acquiring section 216 acquires play videos permitted to be used as help videos from a plurality of information processing devices 10 and records the play videos in the play video recording section 260. In a modification, the server device 5 does not record the play videos, and instead, clustering is performed on play videos recorded in a storage device different from the server device 5. In the server device 5 according to the modification, the video group identifying section 224 acquires meta information of a play video recorded in the different storage device and uses the meta information to identify the group with the play style with which the play video recorded in the different storage device can be associated. The providing portion 246 may provide the user with information concerning the play video that can be associated with the group to which the user belongs. The information concerning the play video may be information for identifying a play video, for example, information for accessing the play video, instead of being the play video itself.

What is claimed is:

1. A server device comprising:
   one or more processors including hardware, wherein the one or more processors are configured to:
   acquire pieces of meta information of a plurality of players,
   use the pieces of meta information of the plurality of players to generate a plurality of groups with different play styles, acquire meta information of a user who is playing a game,
   use the meta information of the user to identify a corresponding one of the groups to which the user belongs,
   acquire a play video of a game generated in response to an operation performed by a player,
   acquire meta information of the play video,
   use the meta information of the play video to identify a corresponding one of the groups with which the play video is able to be associated, and
   provide the user with the play video that is associated with the group to which the user belongs.

2. The server device according to claim 1, wherein the one or more processors select a play video from among a plurality of acquired play videos, in reference to a skill value of a player who generated the play video.

3. An information processing device operated by a user, comprising:
   one or more processors including hardware, wherein the one or more processors are configured to:
   acquire meta information of the user,
   transmit the meta information of the user to a server device,
   acquire information concerning a group to which the user belongs, the group is identified in the server device based on the meta information of the user,
   acquire information concerning a play video that is associated with the group to which the user belongs, the information concerning the play video being identified by the server device based on meta information of the play video and group association, and
   display the acquired information concerning the group and the information concerning the play video.

4. An information providing method, comprising:
   acquiring pieces of meta information of a plurality of players;
   using the pieces of meta information of the plurality of players to generate a plurality of groups with different play styles;
   acquiring meta information of a user who is playing a game;
   using the meta information of the user to identify a corresponding one of the groups to which the user belongs
   providing the user with information concerning the group to which the user belongs; and providing the user with an estimated playing time that is derived in reference to a skill value in the group to which the user belongs.

* * * * *